US011151790B2

(12) United States Patent
Zhang et al.

(10) Patent No.: US 11,151,790 B2
(45) Date of Patent: Oct. 19, 2021

(54) METHOD AND DEVICE FOR ADJUSTING VIRTUAL REALITY IMAGE

(71) Applicant: Shenzhen Dlodlo Technologies Co., Ltd., Guangdong (CN)

(72) Inventors: Dawei Zhang, Guangdong (CN); Shoulun Long, Guangdong (CN); Gang Li, Guangdong (CN); Fengxue Zhang, Guangdong (CN); Xu Xiong, Guangdong (CN)

(73) Assignee: Shenzhen Dlodlo Technologies Co., Ltd., Guangdong (CN)

( * ) Notice: Subject to any disclaimer, the term of this patent is extended or adjusted under 35 U.S.C. 154(b) by 0 days.

(21) Appl. No.: 15/763,718

(22) PCT Filed: Mar. 16, 2016

(86) PCT No.: PCT/CN2016/076543
§ 371 (c)(1),
(2) Date: Mar. 27, 2018

(87) PCT Pub. No.: WO2017/054421
PCT Pub. Date: Apr. 6, 2017

(65) Prior Publication Data
US 2018/0276897 A1 Sep. 27, 2018

(30) Foreign Application Priority Data
Sep. 30, 2015 (CN) .......................... 201510638940.8

(51) Int. Cl.
*G06T 19/00* (2011.01)
*G06T 7/80* (2017.01)
(Continued)

(52) U.S. Cl.
CPC ........ *G06T 19/006* (2013.01); *G02B 27/0172* (2013.01); *G06T 7/00* (2013.01);
(Continued)

(58) Field of Classification Search
CPC ........... G06T 19/006; G06T 7/74; G06T 7/80; G06T 7/00; G06T 15/20; G06T 3/00;
(Continued)

(56) References Cited

U.S. PATENT DOCUMENTS

| 2015/0049002 | A1* | 2/2015 | Ishikawa | G09G 3/003 345/8 |
| 2016/0063713 | A1* | 3/2016 | Okamoto | G06T 7/74 345/419 |
| 2019/0219824 | A1* | 7/2019 | Shinohara | H04N 5/64 |

FOREIGN PATENT DOCUMENTS

| CN | 102023700 A | 4/2011 |
| CN | 102314682 A | 1/2012 |

(Continued)

OTHER PUBLICATIONS

CN 103226838 A (Machine Translation on May 22, 2019) (Year: 2013).*

(Continued)

*Primary Examiner* — Michael Le
(74) *Attorney, Agent, or Firm* — Bret E. Field; Bozicevic, Field & Francis LLP

(57) ABSTRACT

A method for adjusting a virtual reality image including: acquiring first three-dimensional coordinates and a first attitude orientation of a positioning component (101); converting the first three-dimensional coordinates into second three-dimensional coordinates, and converting the first attitude orientation into a second attitude orientation (102); converting the second three-dimensional coordinates into target three-dimensional coordinates in a virtual space, and converting the second attitude orientation into a target attitude orientation in the virtual space (103); determining a projection plane in the virtual space (104); perspectively projecting a virtual object in the virtual space onto an imaging area in the projection plane to generate a two- (Continued)

dimensional image (105); and displaying the two-dimensional image on a display screen of a display module (106). Also disclosed is a device for adjusting a virtual reality image.

6 Claims, 1 Drawing Sheet

(51) Int. Cl.
*G06T 7/00* (2017.01)
*G06T 15/20* (2011.01)
*G06T 7/73* (2017.01)
*G02B 27/01* (2006.01)

(52) U.S. Cl.
CPC .................. *G06T 7/74* (2017.01); *G06T 7/80* (2017.01); *G06T 15/20* (2013.01); *G02B 2027/0178* (2013.01)

(58) Field of Classification Search
CPC ... G06T 19/003; G06T 19/20; G02B 27/0172; G02B 2027/0178; G06F 3/011; G06F 2203/012
See application file for complete search history.

(56) References Cited

FOREIGN PATENT DOCUMENTS

| | | | |
|---|---|---|---|
| CN | 103226838 A | * | 7/2013 |
| CN | 103226838 A | | 7/2013 |
| CN | 104134235 A | | 11/2014 |
| CN | 104427230 A | * | 3/2015 |
| CN | 104427230 A | | 3/2015 |
| CN | 105354820 A | | 2/2016 |
| EP | 0451875 A2 | | 10/1991 |
| JP | 2004151085 A | | 5/2004 |
| JP | 2012068481 A | | 4/2012 |
| JP | 2012252661 A | | 12/2012 |
| JP | 2013545510 A | | 12/2013 |
| WO | WO2015021746 A1 | | 2/2015 |

OTHER PUBLICATIONS

CN 104427230 A (Machine Translation on May 28, 2019) (Year: 2015).*
European Search Report for European Application No. EP16850049, dated Nov. 14, 2018.

* cited by examiner

METHOD AND DEVICE FOR ADJUSTING VIRTUAL REALITY IMAGE

CROSS-REFERENCE TO RELATED APPLICATION

This application claims the benefit of Chinese application No. 201510638940.8 filed on Sep. 30, 2015, titled "METHOD AND DEVICE FOR ADJUSTING VIRTUAL REALITY IMAGE", which is incorporated herein by reference in its entirety.

FIELD OF THE INVENTION

The present invention relates to the field of virtual reality technology, and in particular, to a method and a device for adjusting virtual reality image.

BACKGROUND OF THE INVENTION

Virtual reality (VR, for short) technology is a technology in which a virtual space is constructed via an electronic device and sensory simulation on vision and audition, etc., is provided for a user on the basis of the virtual space. By VR technology, a user may interact with a virtual object in the virtual space, and a on-scene vision experience, audition experience and touch experience etc., may be provided for the user.

In order to strengthen the realism of the virtual space and provide an on-scene vision experience for a user, a virtual reality device often needs to provide different images for the user as the user adjusts his/her posture. For example, for VR glasses, when a user wears the VR glasses on the head, the position and attitude orientation of the VR glasses will change as the user moves or changes the posture of the head, and the image contents provided by the VR glasses also need to be changed. For example, if the user walks forward, the VR glasses need to adjust the image provided by the VR glasses according to the distance and speed at which the user walks forward; if the user turns his/her head or body etc., the VR glasses also need to adjust the image provided by the VR glasses according to direction and extent of the action so as to provide a on-scene vision experience for the user.

Therefore, there needs a method for adjusting virtual reality image provided by a virtual reality device according to the changes in position and attitude orientation of the virtual reality device in the reality space.

SUMMARY OF THE INVENTION

Embodiments of the present invention provide a method and a device for adjusting virtual reality image, thereby meeting the technical demand of adjusting virtual reality image provided by a virtual reality device according to the changes in position and attitude orientation of the virtual reality device in the reality space.

In a first aspect, an embodiment of the invention provides a method for adjusting virtual reality image, which comprises: acquiring first three-dimensional coordinates and a first attitude orientation of a positioning component of a virtual reality device in a reality space coordinate system, wherein, the reality space coordinate system is a three-dimensional coordinate system established by taking a specified point in the reality space as an origin; converting the first three-dimensional coordinates into second three-dimensional coordinates according to a preset first transformation relation, and converting the first attitude orientation into a second attitude orientation, wherein the second three-dimensional coordinates are coordinates of a focal point of a display module of the virtual reality device in the reality space coordinate system, and the second attitude orientation is the attitude orientation of the display module in the reality space coordinate system; converting the second three-dimensional coordinates into target three-dimensional coordinates in a virtual space according to a preset second transformation relation, and converting the second attitude orientation into a target attitude orientation in the virtual space; taking a point indicated by the target three-dimensional coordinates in any specified coordinate system in the virtual space as a projection center, and determining a projection plane in the virtual space according to the target attitude orientation; perspectively projecting the virtual object in the virtual space onto an imaging area in the projection plane to generate a two-dimensional image; and displaying the two-dimensional image on a display screen of the display module.

In conjunction with the first aspect, in a first possible implementation mode of the first aspect, converting the second three-dimensional coordinates into target three-dimensional coordinates in a virtual space according to a preset second transformation relation and converting the second attitude orientation into a target attitude orientation in the virtual space comprises: converting the second three-dimensional coordinates into target three-dimensional coordinates in a virtual space, and keeping the second attitude orientation consistent with the target attitude orientation; taking a point indicated by the target three-dimensional coordinates in any specified coordinate system in the virtual space as a projection center and determining a projection plane in the virtual space according to the target attitude orientation comprises: acquiring a first dimensional value of a dimension corresponding to a visual direction of the display module in the second attitude orientation; setting a dimensional value of a dimension corresponding to the perspective projection direction as the first dimensional value; and taking a point indicated by the target three-dimensional coordinates as the projection center, and determining the projection plane according to the perspective projection direction; wherein, the reality space coordinate system is a three-dimensional coordinate system established by taking a specified point in the reality space as the origin, taking a gravity direction as the first coordinate axis direction and taking the right ahead direction in a horizontal plane of the reality world set by a viewer viewing the virtual space via the virtual reality device as the second coordinate axis direction, and the specified coordinate system is a world coordinate system in the virtual space.

In conjunction with the first aspect, in a second possible implementation mode of the first aspect, converting the second three-dimensional coordinates into target three-dimensional coordinates in a virtual space according to a preset second transformation relation and converting the second attitude orientation into a target attitude orientation in the virtual space comprises: converting the second three-dimensional coordinates into target three-dimensional coordinates in a virtual space, and keeping the second attitude orientation consistent with the target attitude orientation; taking a point indicated by the target three-dimensional coordinates in any specified coordinate system in the virtual space as a projection center and determining a projection plane in the virtual space according to the target attitude orientation comprises: acquiring a second dimensional value of a dimension corresponding to a visual direction of the display module in the second attitude orientation; setting a dimensional value of a dimension corresponding to the perspective projection direction as the second dimensional value; taking a point indicated by the target three-dimensional coordinates as the projection center, and determining the projection plane according to the perspective projection direction; wherein, a transformation relation between the reality space coordinate system and a reality space reference coordinate system is the same as a transformation relation between the specified coordinate system and the world coordinate system in the virtual space, and the reality space reference coordinate system is a three-dimensional coordinate system established by taking a specified point in the reality space as the origin, taking a gravity direction in the reality space as the first coordinate axis direction and taking a south direction or a north direction in the reality space as the second coordinate axis direction.

In conjunction with the second possible implementation mode of the first aspect, in a third possible implementation mode of the first aspect, a difference between the transformation relation and the reference transformation relation is a fixed value in a specified time period, wherein the reference transformation relation is the transformation relation between the reality space coordinate system and the reality space reference coordinate system employed by a reference viewer when viewing the virtual space via the virtual reality device.

In conjunction with the third possible implementation mode of the first aspect, in a fourth possible implementation mode of the first aspect, the origin of the specified coordinate system is a position in the virtual space when the reference viewer views the virtual space via the virtual reality device.

In conjunction with the first aspect, in a fifth possible implementation mode of the first aspect, taking a point indicated by the target three-dimensional coordinates in any specified coordinate system in the virtual space as a projection center and determining a projection plane in the virtual space according to the target attitude orientation comprises: determining a reference projection point set by a reference viewer; calculating a position difference between the reference projection point and the projection center at a specific time; converting the specified coordinate system into a reference coordinate system according to the position difference; taking a point indicated by the target three-dimensional coordinates in the reference coordinate system as the projection center, and determining a projection plane in the virtual space according to the target attitude orientation.

In a second aspect, an embodiment of the invention further provides a device for adjusting a virtual reality image, which comprises: an acquisition unit, configured for acquiring first three-dimensional coordinates and a first attitude orientation of a positioning component of a virtual reality device in a reality space coordinate system, wherein the reality space coordinate system is a three-dimensional coordinate system established by taking a specified point in the reality space as an origin; a first conversion unit, configured for converting the first three-dimensional coordinates into second three-dimensional coordinates according to a preset first transformation relation and converting the first attitude orientation into a second attitude orientation, wherein the second three-dimensional coordinates is coordinates of a focal point of a display module of the virtual reality device in the reality space coordinate system, and the second attitude orientation is the attitude orientation of the display module in the reality space coordinate system; a second conversion unit, configured for converting the second three-dimensional coordinates into target three-dimensional coordinates in a virtual space according to a preset second transformation relation and converting the second attitude orientation into a target attitude orientation in the virtual space; a projection plane determination unit, configured for taking a point indicated by the target three-dimensional coordinates in any specified coordinate system in the virtual space as a projection center and determining a projection plane in the virtual space according to the target attitude orientation; a projection unit, configured for perspectively projecting the virtual object in the virtual space onto an imaging area in the projection plane to generate a two-dimensional image; and a display unit, configured for displaying the two-dimensional image on a display screen of the display module.

In conjunction with the second aspect, in a first possible implementation mode of the second aspect, the second conversion unit is specifically configured for converting the second three-dimensional coordinates into target three-dimensional coordinates in a virtual space and keeping the second attitude orientation consistent with the target attitude orientation; the projection plane determination unit comprises: a first dimensional value acquisition subunit, configured for acquiring a first dimensional value of a dimension corresponding to a visual direction of the display module in the second attitude orientation; a first projection direction determination subunit, configured for setting a dimensional value of a dimension corresponding to the perspective projection direction as the first dimensional value; a first projection plane determination subunit, configured for taking a point indicated by the target three-dimensional coordinates as the projection center and determining the projection plane according to the perspective projection direction; wherein, the reality space coordinate system is a three-dimensional coordinate system established by taking a specified point in the reality space as the origin, taking a gravity direction as the first coordinate axis direction and taking the right ahead direction in a horizontal plane of the reality world set by a viewer viewing the virtual space via the virtual reality device as the second coordinate axis direction, and the specified coordinate system is a world coordinate system in the virtual space.

In conjunction with the second aspect, in a second possible implementation mode of the second aspect, the second conversion unit is specifically configured for converting the second three-dimensional coordinates into target three-dimensional coordinates in a virtual space and keeping the second attitude orientation consistent with the target attitude orientation; the projection plane determination unit comprises: a second dimensional value determination subunit, configured for acquiring a second dimensional value of a dimension corresponding to a visual direction of the display module in the second attitude orientation; a first projection direction determination subunit, configured for setting a dimensional value of a dimension corresponding to the perspective projection direction as the second dimensional value; a second projection plane determination subunit, configured for taking a point indicated by the target three-dimensional coordinates as the projection center and determining the projection plane according to the perspective projection direction; wherein, a transformation relation between the reality space coordinate system and a reality space reference coordinate system is the same as a transformation relation between the specified coordinate system and the world coordinate system in the virtual space, and the reality space reference coordinate system is a three-dimensional coordinate system established by taking a specified point in the reality space as the origin, taking a gravity direction in the reality space as the first coordinate axis direction and taking a south direction or a north direction in the reality space as the second coordinate axis direction.

In conjunction with the second aspect, in a third possible implementation mode of the second aspect, the projection plane determination unit comprises: a projection point determination subunit, configured for determining a reference projection point set by a reference viewer; a difference calculation subunit, configured for calculating a position difference between the reference projection point and the projection center at a specific time; a coordinate system conversion subunit, configured for converting the specified coordinate system into a reference coordinate system according to the position difference; and a third projection plane determination subunit, configured for taking a point indicated by the target three-dimensional coordinates in the reference coordinate system as the projection center and determining a projection plane in the virtual space according to the target attitude orientation.

In the embodiments of the invention, first three-dimensional coordinates and a first attitude orientation of a positioning component of a virtual reality device in a reality space coordinate system are acquired, wherein the reality space coordinate system is a three-dimensional coordinate system established by taking a specified point in the reality space as an origin; the first three-dimensional coordinates are converted into second three-dimensional coordinates according to a preset first transformation relation, and the first attitude orientation is converted into a second attitude orientation, wherein the second three-dimensional coordinates are coordinates of a focal point of a display module of the virtual reality device in the reality space coordinate system, and the second attitude orientation is the attitude orientation of the display module in the reality space coordinate system; the second three-dimensional coordinates are converted into target three-dimensional coordinates in a virtual space according to a preset second transformation relation, and the second attitude orientation is converted into a target attitude orientation in the virtual space; a point indicated by the target three-dimensional coordinates in any specified coordinate system in the virtual space is taken as a projection center, and a projection plane in the virtual space is determined according to the target attitude orientation; the virtual object in the virtual space is perspectively projected onto an imaging area in the projection plane to generate a two-dimensional image; and the two-dimensional image is displayed on a display screen of the display module. By the method and the device according to the invention, a projection plane may be determined according to the position and attitude orientation of a VR device in the reality space, and a two-dimensional image is generated, so that the VR device can adjust the two-dimensional image generated when its position or attitude orientation changes. Therefore, the virtual reality image provided by the virtual reality device may be adjusted according to the changes in position and attitude orientation of the virtual reality device in the reality space.

BRIEF DESCRIPTION OF THE DRAWINGS

In order to more clearly illustrate the technical solutions of the embodiments of the invention or of the prior art, the drawings needed in the description of the embodiments or the prior art will be briefly introduced below. Apparently, the drawings in the description below are only some embodiments of the invention, and other drawings may also be obtained by one of ordinary skills in the art according to these drawings without creative work.

DETAILED DESCRIPTION OF THE EMBODIMENTS

The technical solutions in the embodiments of the invention will be described clearly and fully below in conjunction with the drawings in the embodiments of the invention. Apparently, the embodiments described are only a part of the embodiments of the invention, rather than being the whole embodiments. All the other embodiments obtained by one of ordinary skills in the art based on the embodiments of the invention without creative work pertain to the protection scope of the invention.

Figure 1:
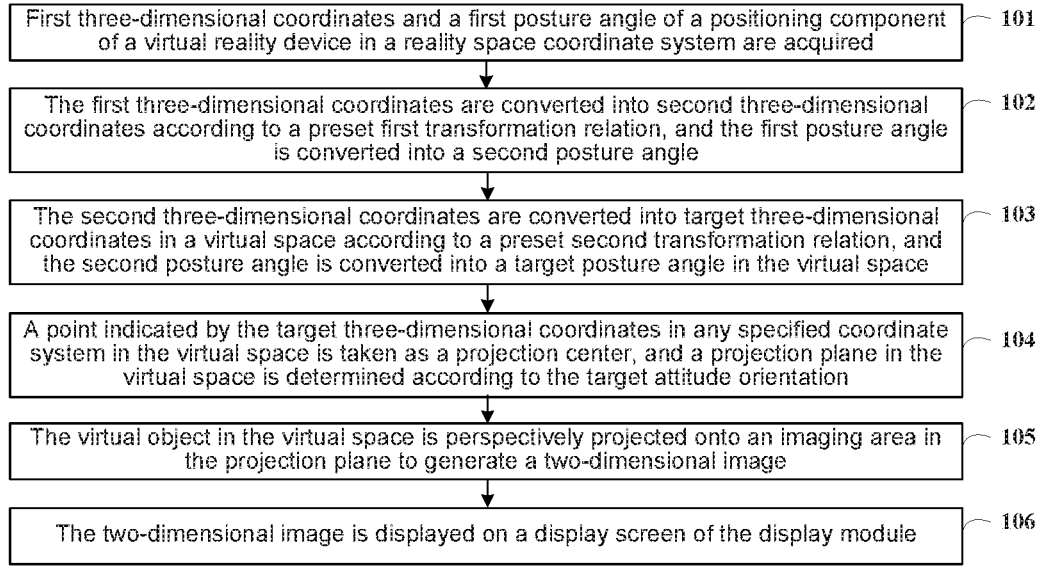
FIG. 1 is a schematic flow chart showing one embodiment of a method for adjusting a virtual reality image according to the invention.

Referring to FIG. 1, it is a schematic flow chart showing one embodiment of a method for adjusting a virtual reality image according to the invention. The method may be performed by a virtual reality (VR for short) device, and the VR device may be VR glasses and VR helmets, etc., and the positioning component of the virtual reality device may be a device with an ability of acquiring and reporting a reality space position and a space attitude orientation. The method includes the steps below:

Step 101: first three-dimensional coordinates and a first attitude orientation of a positioning component of a virtual reality device in a reality space coordinate system are acquired.

Because the position and attitude orientation of the positioning component of the VR device in the reality space may reflect the position and attitude orientation of the VR device in the reality, the VR device may first acquire the first three-dimensional coordinates and the first attitude orientation of the positioning component in a reality space coordinate system, wherein, the reality space coordinate system is a three-dimensional coordinate system established by taking a specified point in the reality space as an origin. Under normal conditions, it may be regarded that the first three-dimensional coordinates are the coordinates of the VR device in the reality space coordinate system, and the first attitude orientation may reflect the attitude of the VR device in the reality space coordinate system.

Step 102: the first three-dimensional coordinates are converted into second three-dimensional coordinates according to a preset first transformation relation, and the first attitude orientation is converted into a second attitude orientation.

Because, on the VR device, the position of the positioning component and the position of the display module are relatively fixed, the position of the positioning component and the position of the focal point of the display module are also relatively fixed. Similarly, the attitude orientation of the positioning component and the attitude orientation of the display module are also relatively fixed. Therefore, the first three-dimensional coordinates may be converted into second three-dimensional coordinates according to a preset first transformation relation, and the first attitude orientation may be converted into a second attitude orientation, wherein the second three-dimensional coordinates are coordinates of the focal point of the display module of the virtual reality device in the reality space coordinate system, and the second attitude orientation is the attitude orientation of the display module in the reality space coordinate system. The attitude of the display module in the reality space may be determined according to the second attitude orientation, and the position of the focal point of the display module in the reality space may be determined according to the second three-dimensional coordinates. Here, it needs to be noted that, the display module may be consisted of a display screen and optical components.

Step 103: the second three-dimensional coordinates are converted into a target three-dimensional coordinates in a virtual space according to a preset second transformation relation, and the second attitude orientation is converted into a target attitude orientation in the virtual space.

After the attitude orientation of the display module and the second three-dimensional coordinates of the focal point of the display module are determined, the second three-dimensional coordinates may be converted into target three-dimensional coordinates in a virtual space according to a preset second transformation relation, and the second attitude orientation may be converted into a target attitude orientation in the virtual space.

The second transformation relation may be set as required. For example, the coordinate values of the second three-dimensional coordinates may be directly taken as the coordinate values of the target three-dimensional coordinates, and at the same time, the second attitude orientation may be kept consistent with the target attitude orientation; or, the second three-dimensional coordinates may be converted into the target three-dimensional coordinates according to a preset coordinate transformation relation, and the second attitude orientation may be converted into the target attitude orientation according to a preset attitude orientation transformation relation.

Step 104: a point indicated by the target three-dimensional coordinates in any specified coordinate system in the virtual space is taken as a projection center, and a projection plane in the virtual space is determined according to the target attitude orientation.

After the target three-dimensional coordinates and the target attitude orientations are determined, the projection plane in the virtual space may be determined according to the target three-dimensional coordinates and the target attitude orientation.

Optionally, the VR device may first acquires a first dimensional value of a dimension corresponding to a visual direction of the display module in the second attitude orientation; then it sets a dimensional value of a dimension corresponding to the perspective projection direction as the first dimensional value; next, it takes a point indicated by the target three-dimensional coordinates as the projection center and determines the projection plane according to the perspective projection direction, wherein, the reality space coordinate system is a three-dimensional coordinate system established by taking a specified point in the reality space as the origin, taking a gravity direction as the first coordinate axis direction and taking the right ahead direction in a horizontal plane of the reality world set by a viewer viewing the virtual space via the virtual reality device as the second coordinate axis direction, and the specified coordinate system is a world coordinate system in the virtual space.

Optionally, the VR device may acquire a second dimensional value of a dimension corresponding to a visual direction of the display module in the second attitude orientation; then it sets a dimensional value of a dimension corresponding to the perspective projection direction as the second dimensional value; next, it takes a point indicated by the target three-dimensional coordinates as the projection center and determines the projection plane according to the perspective projection direction; wherein, the transformation relation between the reality space coordinate system and a reality space reference coordinate system is the same as the transformation relation between the specified coordinate system and the world coordinate system in the virtual space, and the reality space reference coordinate system is a three-dimensional coordinate system established by taking a specified point in the reality space as the origin, taking a gravity direction in the reality space as the first coordinate axis direction and taking a south direction or a north direction in the reality space as the second coordinate axis direction. Wherein, the difference between the transformation relation and the reference transformation relation may be a fixed value in a specified time period, and the reference transformation relation may be the transformation relation between the reality space coordinate system and the reality space reference coordinate system employed by a reference viewer when viewing the virtual space via the virtual reality device. The origin of the specified coordinate system may be a position in the virtual space when the reference viewer views the virtual space via the virtual reality device. The difference between the transformation relation and the reference transformation relation is a fixed value in a specified time period, which means that the reference transformation relation may be converted into the transformation relation in a fixed conversion mode in a specified time period.

Optionally, the VR device may also first determine a reference projection point set by a reference viewer; then, it calculates a position difference between the reference projection point and the projection center at a specific time; next, it converts the specified coordinate system into a reference coordinate system according to the position difference; and finally, it takes a point indicated by the target three-dimensional coordinates in the reference coordinate system as the projection center and determines a projection plane in the virtual space according to the target attitude orientation.

When the VR device determines the projection plane according to the projection center and the perspective projection direction, it may select a plane vertical to the projection direction in the virtual space as the projection plane, and the distance from the projection plane to the projection center may be equal to or proportional to the distance from the focal point of the display module to the display module Step 105: the virtual object in the virtual space is perspectively projected onto an imaging area in the projection plane to generate a two-dimensional image.

After the projection point, the projection direction and the projection plane are all determined, the VR device may perspectively project the virtual object in the virtual space onto an imaging area in the projection plane to generate a two-dimensional image. For the principles and implementation modes of perspective projection, reference may be made to the prior art, and it will not be described again here.

Step 106: the two-dimensional image is displayed on a display screen of the display module.

After the two-dimensional image is generated via perspective projection, it may be displayed on the display screen of the display module.

By employing this embodiment, the VR device may determine a projection plane according to the position and attitude orientation of a VR device in the reality space and generate a two-dimensional image, so that the VR device can adjust the two-dimensional image generated when its position or attitude orientation changes. Therefore, the virtual reality image provided by the virtual reality device may be adjusted according to the changes in position and attitude orientation of the virtual reality device in the reality space.

Figure 2:
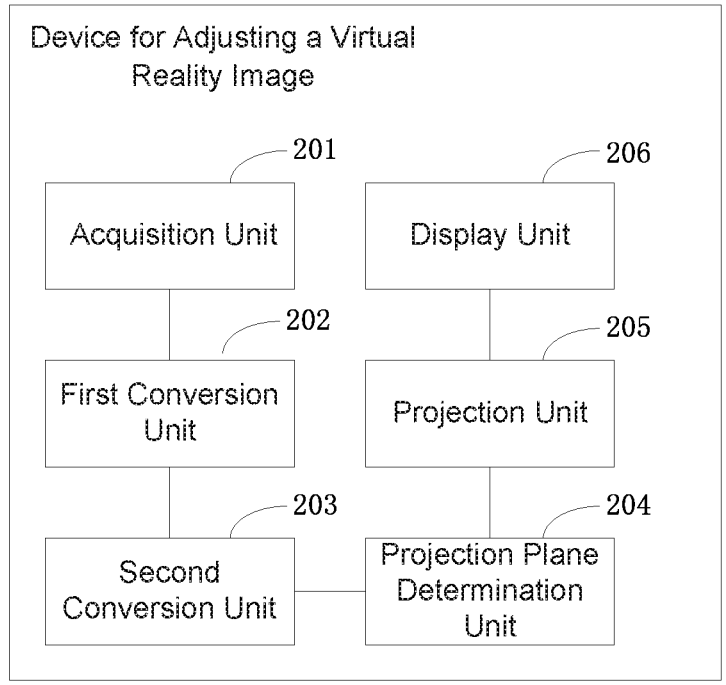
FIG. 2 is a structural representation of one embodiment of a device for adjusting a virtual reality image according to the invention.

Referring to FIG. 2, it is a structural representation of one embodiment of a device for adjusting a virtual reality image according to the invention.

As shown in FIG. 2, the device may include: an acquisition unit 201, a first conversion unit 202, a second conversion unit 203, a projection plane determination unit 204, a projection unit 205 and a display unit 206.

Wherein, the acquisition unit 201 is configured for acquiring first three-dimensional coordinates and a first attitude orientation of a positioning component of a VR device in a reality space coordinate system, wherein the reality space coordinate system is a three-dimensional coordinate system established by taking a specified point in the reality space as an origin.

The first conversion unit 202 is configured for converting the first three-dimensional coordinates into second three-dimensional coordinates according to a preset first transformation relation and converting the first attitude orientation into a second attitude orientation, wherein the second three-dimensional coordinates are coordinates of a focal point of a display module of the virtual reality device in the reality space coordinate system, and the second attitude orientation is the attitude orientation of the display module in the reality space coordinate system.

The second conversion unit 203 is configured for converting the second three-dimensional coordinates into target three-dimensional coordinates in a virtual space according to a preset second transformation relation and converting the second attitude orientation into a target attitude orientation in the virtual space.

The projection plane determination unit 204 is configured for taking a point indicated by the target three-dimensional coordinates in any specified coordinate system in the virtual space as a projection center and determining a projection plane in the virtual space according to the target attitude orientation.

The projection unit 205 is configured for perspectively projecting the virtual object in the virtual space onto an imaging area in the projection plane to generate a two-dimensional image.

The display unit 206 is configured for displaying the two-dimensional image on a display screen of the display module.

Optionally, the second conversion unit 203 is specifically configured for converting the second three-dimensional coordinates into target three-dimensional coordinates in a virtual space and keeping the second attitude orientation consistent with the target attitude orientation.

Optionally, the projection plane determination unit 204 includes: a first dimensional value acquisition subunit, configured for acquiring a first dimensional value of a dimension corresponding to a visual direction of the display module in the second attitude orientation; a first projection direction determination subunit, configured for setting a dimensional value of a dimension corresponding to the perspective projection direction as the first dimensional value; and a first projection plane determination subunit, configured for taking a point indicated by the target three-dimensional coordinates as the projection center, and determining the projection plane according to the perspective projection direction; wherein, the reality space coordinate system is a three-dimensional coordinate system established by taking a specified point in the reality space as the origin, taking a gravity direction as the first coordinate axis direction and taking the right ahead direction in a horizontal plane of the reality world set by a viewer viewing the virtual space via the virtual reality device as the second coordinate axis direction, and the specified coordinate system is a world coordinate system in the virtual space.

Optionally, the projection plane determination unit 204 includes: a second dimensional value determination subunit, configured for acquiring a second dimensional value of a dimension corresponding to a visual direction of the display module in the second attitude orientation; a first projection direction determination subunit, configured for setting a dimensional value of a dimension corresponding to the perspective projection direction as the second dimensional value; and a second projection plane determination subunit, configured for taking a point indicated by the target three-dimensional coordinates as the projection center and determining the projection plane according to the perspective projection direction; wherein, the transformation relation between the reality space coordinate system and a reality space reference coordinate system is the same as the transformation relation between the specified coordinate system and the world coordinate system in the virtual space, and the reality space reference coordinate system is a three-dimensional coordinate system established by taking a specified point in the reality space as the origin, taking a gravity direction in the reality space as the first coordinate axis direction and taking a south direction or a north direction in the reality space as the second coordinate axis direction.

Optionally, the projection plane determination unit 204 includes: a projection point determination subunit, configured for determining a reference projection point set by a reference viewer; a difference calculation subunit, configured for calculating a position difference between the reference projection point and the projection center at a specific time; a coordinate system conversion subunit, configured for converting the specified coordinate system into a reference coordinate system according to the position difference; and a third projection plane determination subunit, configured for taking a point indicated by the target three-dimensional coordinates in the reference coordinate system as the projection center and determining a projection plane in the virtual space according to the target attitude orientation.

By employing this embodiment, the VR device may determine a projection plane according to the position and attitude orientation of a VR device in the reality space and generate a two-dimensional image, so that the VR device can adjust the two-dimensional image generated when its position or attitude orientation changes. Therefore, the virtual reality image provided by the virtual reality device may be adjusted according to the changes in position and attitude orientation of the virtual reality device in the reality space.

One skilled in the art may clearly understand that the invention may be implemented by the aid of software and necessary universal hardware platform. Based on such an understanding, the essential part of the technical solutions in the embodiments of the invention, or in other words, the part that contributes to the prior art, may be embodied in the form of a software product that is stored in a storage medium, for example, ROM/RAM, magnetic disc or compact disc, etc., and includes several instructions that can make a computer device (which may be a personal computer, a server or a network device, etc.) implement the method according to each embodiment of the invention or a certain part thereof.

Each embodiment in this specification is described in a stepped mode. For the same or similar part between each embodiment, reference may be made to each other, and each embodiment focuses on the difference from other embodiments. Especially, for a device or system embodiment, because it is basically similar to a method embodiment, the description thereof will be simple, and reference may be made to the part of the illustration of the method embodiment for the related part.

The above description only shows some specific implementation modes of the invention. It should be pointed out that, for one of ordinary skills in the art, several improvements and modifications may also be made without departing from the principles of the invention, and all these improvements and modifications should be regarded as falling into the protection scope of the invention.

What is claimed is:

1. A method for adjusting a virtual reality image, comprising:
    acquiring first three-dimensional coordinates and a first attitude orientation of a positioning component of a virtual reality device in a reality space coordinate system, wherein, the reality space coordinate system is a three-dimensional coordinate system established by taking a specified point in the reality space as an origin;
    converting the first three-dimensional coordinates into second three-dimensional coordinates according to a preset first transformation relation, and converting the first attitude orientation into a second attitude orientation, wherein the second three-dimensional coordinates are coordinates of a focal point of a display module of the virtual reality device in the reality space coordinate system, and the second attitude orientation is the attitude orientation of the display module in the reality space coordinate system;
    converting the second three-dimensional coordinates into target three-dimensional coordinates in a virtual space according to a preset second transformation relation, and converting the second attitude orientation into a target attitude orientation in the virtual space;
    taking a point indicated by the target three-dimensional coordinates in any specified coordinate system in the virtual space as a projection center, and determining a projection plane in the virtual space according to the target attitude orientation;
    perspectively projecting a virtual object in the virtual space onto an imaging area in the projection plane to generate a two-dimensional image, wherein the virtual object is preset in the virtual space; and
    displaying the two-dimensional image on a display screen of the display module,
    wherein the acquiring, converting, taking, projecting, and displaying operations are performed by a computer processor.

2. The method according to claim 1, wherein, converting the second three-dimensional coordinates into target three-dimensional coordinates in a virtual space according to a preset second transformation relation and converting the second attitude orientation into a target attitude orientation in the virtual space comprises:
    converting the second three-dimensional coordinates into target three-dimensional coordinates in a virtual space, and keeping the second attitude orientation consistent with the target attitude orientation;
    taking a point indicated by the target three-dimensional coordinates in any specified coordinate system in the virtual space as a projection center and determining a projection plane in the virtual space according to the target attitude orientation comprises:
    acquiring a first dimensional value of a dimension corresponding to a visual direction of the display module in the second attitude orientation;
    setting a dimensional value of a dimension corresponding to the perspective projection direction as the first dimensional value;
    taking a point indicated by the target three-dimensional coordinates as the projection center, and determining the projection plane according to the perspective projection direction;
    wherein, the reality space coordinate system is a three-dimensional coordinate system established by taking a specified point in the reality space as the origin, taking a gravity direction as the first coordinate axis direction and taking the right ahead direction in a horizontal plane of the reality world set by a viewer viewing the virtual space via the virtual reality device as the second coordinate axis direction, and the specified coordinate system is a world coordinate system in the virtual space.

3. The method according to claim 1, wherein, converting the second three-dimensional coordinates into target three-dimensional coordinates in a virtual space according to a preset second transformation relation and converting the second attitude orientation into a target attitude orientation in the virtual space comprises:
    converting the second three-dimensional coordinates into target three-dimensional coordinates in a virtual space, and keeping the second attitude orientation consistent with the target attitude orientation;
    taking a point indicated by the target three-dimensional coordinates in any specified coordinate system in the virtual space as a projection center and determining a projection plane in the virtual space according to the target attitude orientation comprises:
    acquiring a second dimensional value of a dimension corresponding to a visual direction of the display module in the second attitude orientation;
    setting a dimensional value of a dimension corresponding to the perspective projection direction as the second dimensional value;
    taking a point indicated by the target three-dimensional coordinates as the projection center, and determining the projection plane according to the perspective projection direction;
    wherein, a transformation relation between the reality space coordinate system and a reality space reference coordinate system is the same as a transformation relation between the specified coordinate system and the world coordinate system in the virtual space, the reality space reference coordinate system is a three-dimensional coordinate system established by taking a specified point in the reality space as the origin, taking a gravity direction in the reality space as the first coordinate axis direction and taking a south direction or a north direction in the reality space as the second coordinate axis direction.

4. The method according to claim 3, wherein, a difference between the transformation relation and the reference transformation relation is a fixed value in a specified time period, wherein the reference transformation relation is a transformation relation between the reality space coordinate system and the reality space reference coordinate system employed by a reference viewer when viewing the virtual space via the virtual reality device.

5. The method according to claim 4, wherein, the origin of the specified coordinate system is a position in the virtual space when the reference viewer views the virtual space via the virtual reality device.

6. The method according to claim 1, wherein, taking a point indicated by the target three-dimensional coordinates in any specified coordinate system in the virtual space as a projection center and determining a projection plane in the virtual space according to the target attitude orientation comprises:

- determining a reference projection point set by a reference viewer;
- calculating a position difference between the reference projection point and the projection center at a specific time;
- converting the specified coordinate system into a reference coordinate system according to the position difference; and
- taking a point indicated by the target three-dimensional coordinates in the reference coordinate system as the projection center, and determining a projection plane in the virtual space according to the target attitude orientation.

\* \* \* \* \*